United States Patent [19]

Searcy et al.

[11] Patent Number: 5,367,769
[45] Date of Patent: Nov. 29, 1994

[54] METHOD OF MANUFACTURING A ROTARY SCANNING DRUM

[75] Inventors: Ronald L. Searcy, Londonderry, N.H.; Calvin M. Winey, Carlisle, Mass.; Mark W. Magee, Derry, N.H.

[73] Assignee: Howtek, Inc., Hudson, N.H.

[21] Appl. No.: 951,133

[22] Filed: Sep. 25, 1992

[51] Int. Cl.⁵ .............................................. B23P 15/00
[52] U.S. Cl. ................................. 29/895.22; 29/895.3
[58] Field of Search ............ 29/895.21, 895.22, 895.23, 29/895.3; 82/1.11, 168; 492/30-36, 47; 279/2.17

[56] References Cited

U.S. PATENT DOCUMENTS

| | | | |
|---|---|---|---|
| 501,228 | 7/1893 | Jantz | 29/895.22 |
| 790,210 | 5/1905 | Knox | 29/895.22 |
| 1,828,530 | 10/1931 | Fraser | |
| 2,992,787 | 7/1961 | Craig | 279/2.17 |
| 4,617,714 | 10/1986 | Kori et al. | 82/1.11 |
| 4,620,463 | 11/1986 | Horn et al. | 82/1.11 |
| 4,621,400 | 11/1986 | van der Graaf | 29/895.23 |
| 4,934,227 | 6/1990 | Knorr | 82/1.11 |
| 5,003,851 | 4/1991 | Kawada et al. | 82/1.11 |
| 5,026,133 | 6/1991 | Roddy et al. | |
| 5,138,918 | 8/1992 | Attardi et al. | 82/1.11 |

FOREIGN PATENT DOCUMENTS

| | | | |
|---|---|---|---|
| 863716 | 4/1941 | France | |
| 0037330 | 7/1984 | Japan | 29/895.22 |

Primary Examiner—Irene Cuda
Attorney, Agent, or Firm—Cesari and McKenna

[57] ABSTRACT

A drum for a rotary scanner operable in both a transmissive and a reflective mode is manufactured to high concentricity yet relatively inexpensively by mounting an oversized (in thickness) drum blank of possibly varying diameter and thickness on a cylindrical mandrel and thereafter turning it on a lathe to the required external radius. End caps containing mounting means defining the effective scan axis are then secured to the drum for subsequent mounting in a rotary scanner.

6 Claims, 2 Drawing Sheets

METHOD OF MANUFACTURING A ROTARY SCANNING DRUM

BACKGROUND OF THE INVENTION

A. Field of the Invention

The invention relates to scanners for providing a digitized image of a document and, more particularly, to a method of manufacturing a highly concentric cylindrical drum for a rotary scanner operable in both a transmissive and a reflective scanning mode.

B. Prior Art

Rotary scanners mount an image source on a drum for scanning by a scanning head. Relative rotational and translational motion between the drum and the head is provided to form successive scan lines. In scanners which are capable of operation in both a transmissive and a reflective mode, the drum is in the form of a thin-walled shell of a translucent material. In the reflective scanning mode, light is reflected from an image source such as a document mounted on the drum into the scanning head for subsequent analysis; in the transmissive scanning mode, light is transmitted through both the drum and through a document mounted on the drum and is thence collected by the scanning head lens for subsequent analysis.

In order to maintain good imaging performance, it is essential to maintain the concentricity of the inside and outside drum diameters about the rotational axis of the drum within a very narrow tolerance range. This not only insures that the distance between the outside surface of the drum and the scanning head remains relatively constant as the drum rotates, but also insures that the illuminating light traverses a relatively constant wall thickness in the transmissive scanning mode. This minimizes changes in the illumination level due to thickness-dependent refraction effects.

Much effort and cost has been expended on a variety of manufacturing techniques for obtaining the desired concentricity. In some cases, for example, specially cast drum stock of controlled dimensions is prepared, and the drum is further worked to obtain the requisite concentricity. Typically, the working includes carefully machining and polishing the inner and outer drum surfaces and repeatedly reworking them .until the desired concentricity is obtained . The cost of these operations, as well as the cost of special drum stock, is generally quite high, and this is reflected in the cost of the resultant end product which may commonly run to several thousands of dollars.

A further constraint on the manufacture of rotary scanner drums is the nature of the drum material itself. An acrylic material is found to have desirable optical properties for scanners, but is relatively soft and thus easily scratched. Accordingly, special care must be taken during the drum manufacturing process to avoid accidental cuts or scratches which destroy the entire blank or at least force major reworking. Further, the presence of "inclusions" such as air bubbles and the like may ruin an otherwise acceptable drum. The result of these factors is frequently drums that are either not wholly satisfactory for the intended purpose, or that are quite high in price.

OBJECTS OF THE INVENTION

A. Objects

Accordingly, it is an object of the invention to provide an improved drum for a rotary scanner.

Further, it is an object of the invention to provide an improved drum for a rotary scanner that is of lesser cost than drums of comparable quality.

Still a further object of the invention is to provide an improved rotary scanner drum for operation in both the transmissive and the reflective scanning mode.

Yet a further object of the invention is to provide an improved method of manufacturing a drum for a rotary scanner.

B. Brief Description of the Invention

In accordance with the present invention, a cylindrical drum suitable for use in a rotary scanner having both transmissive and reflective capabilities is formed from common commercial grade acrylic stock of the type used in industrial laboratories for acid drains and the like. We have determined that while such stock does not initially possess the needed concentricity of inner and outer diameters, it does possess a sufficient inner wall roundness as to enable achievement of final tolerance while working only the outer surface.

In particular,.in the preferred embodiment of the present invention, the finished drum has an inside diameter of approximately 3.5 inches, an outside diameter of approximately 4.0 inches, and thus a wall thickness of approximately 0.25 inches. We have found that commercial grade stock in this general size has an internal diameter roundness within 0.005 inch. Accordingly, we use the inner diameter as a reference and conform the outer diameter to this reference. Because the inner surface is not worked by our procedure, we are able to use stock of thinner wall thickness than was heretofore the case, and thus minimize the likelihood of unacceptable inclusions in the material, since the latter are proportional to volume.

Specifically, in accordance with the invention, we mount the selected shell stock on a mandrel of a length comparable to that of the shell to be formed into a drum, and of a diameter slightly less than the smallest inside diameter of the shell to be processed. It is secured to the drum by any of a variety of means. In accordance with the preferred embodiment of the invention described herein, the mandrel is fixed to the shell by means of a pair of end plates which are attached to the mandrel after the latter is inserted into the shell, together with a corresponding pair of gaskets which are positioned intermediate the respective end plates and mandrel.

For this purpose, the ends of the mandrel and the inner ends of the end plates are beveled in order to cradle the gaskets between the end plates and the mandrel. Screws or other fastening means secure the end plates to the mandrel. As the fastening means is tightened, the gaskets are increasingly forced against the shell and thereby lock it against the mandrel.

The mandrel is thereafter mounted in a tool such as a lathe, and the shell is turned against a tool such as a cutting tool, a sanding tool, or the like, which progressively removes outer material from the shell to bring it to a desired outer diameter. The outer surface of the shell is formed concentric with the longitudinal axis of the mandrel, which effectively defines the rotational axis of the shell. This rotational axis is thereafter preserved by fitting a pair of end caps to the shell to form the completed drum.

The end caps comprise cylindrical caps which fit snugly on the ends of the shell after it is formed to the desired outer diameter. Preferably, the end faces of the shell are bored to snugly receive a flange of the end caps, and may thereafter be secured to the shell by adhesive or the like. The end caps are formed to have an accurately defined axis of rotation so that, together, they define the axis of rotation of the resultant drum. Thus, the rotational axis effectively defined by the mandrel during processing of the shell is preserved by means of the end caps.

A calibration strip is then mounted on the drum. This strip (whose function is described in more detail in the copending application, Ser. No. 07/940,244 of Richard F. Lehman et al. the contents of which are incorporated herein by reference) spans the length of the drum and extends along the drum circumference for a limited distance, e.g., ⅜ inch. In serves the dual role of assisting in calibrating the scanner and also of "hiding" any inclusions that may be present in the drum in the area coincident with the strip.

DETAILED DESCRIPTION OF THE INVENTION

The foregoing and other and further objects and features of the invention will be more readily understood on reference to the following detailed description of the invention when taken in conjunction with the accompanying drawings in which.

Figure 1:
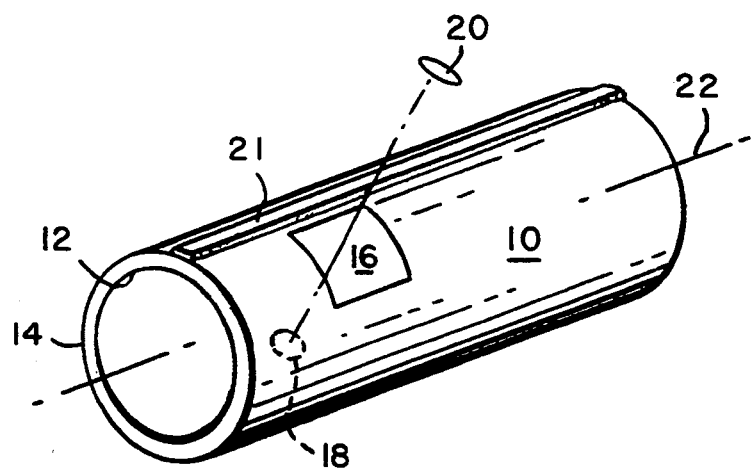
FIG. 1 is a view in perspective of a typical cylindrical shell rotary drum usable in both the transmissive and reflective scanning modes in accordance with the present invention.

In FIG. 1, a rotary scanner drum 10 of a translucent material such as acrylic has inner and outer surfaces 12 and 14, respectively. A document 16 that is to be scanned for subsequent processing is illuminated by light sources 17 or 18 and imaged by a lens 20. Source 17 is used for reflective scanning; source 18 is used for transmissive scanning. A calibration strip 21 extends transversely across the drum on the outer surface thereof.

Figure 2:
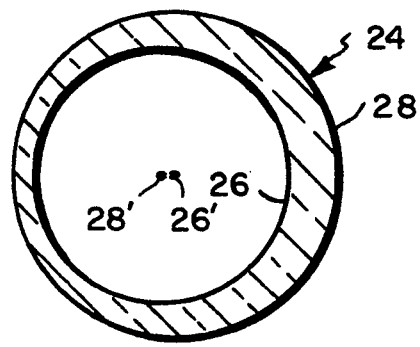
FIG. 2 is a diagrammatic view of a typical cross section of a shell blank from which the drum of FIG. 1 is formed, illustrating the lack of concentricity of the inner and outer surfaces found in such shells prior to processing.

In order to maintain a constant distance between the surface of the drum and the lens 20, and thus a constant focus, it is essential that the drum surface be highly concentric about the drum axis 22. Tubular stock as to which special forming procedures have not been used may appear regular and concentric when viewed on a macroscopic scale, but it will be found that its surfaces are in fact irregular and non-concentric when viewed on a microscopic scale. This is shown illustratively in FIG. 2 which is a cross-sectional view of a typical shell stock 24 with the eccentricity of the inner and outer surfaces 26, 28, respectively, greatly exaggerated in order to indicate the nature of the problem. While both surfaces are relatively round (i.e., of generally constant diameter, within a given tolerance, at a particular cross section), they are not concentric, the inner surface being centered at point 26' and the outer surface being centered at point 28' which is not coincident with point 26'.

Figure 3:
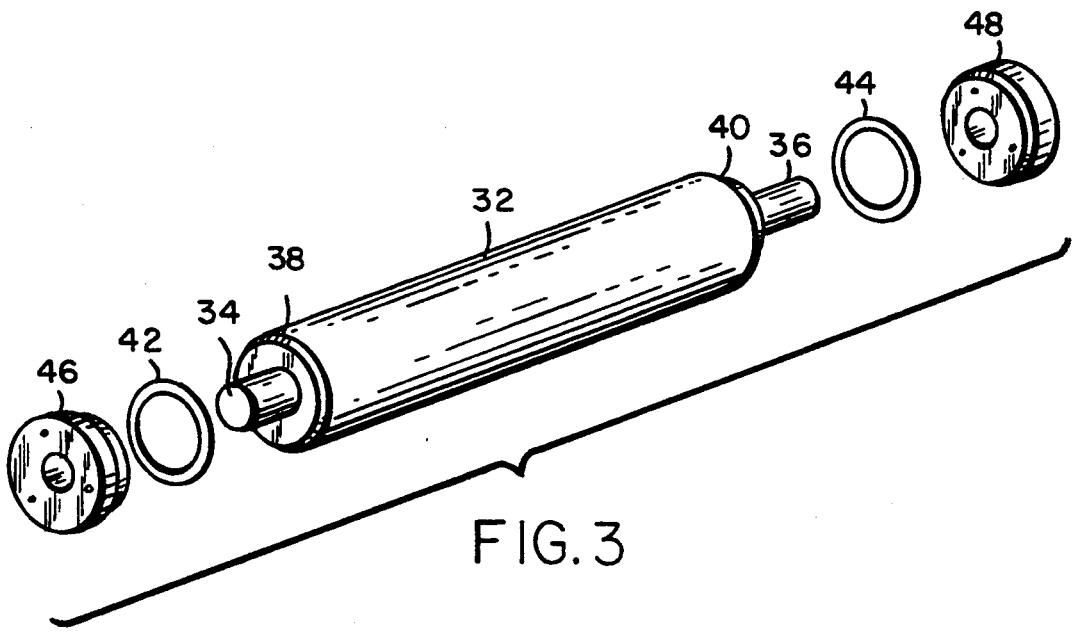
FIG. 3 is a view in perspective of a tool in accordance with the present invention for forming an acceptable rotary scanning drum from the shell of FIG. 2.
Figure 4:
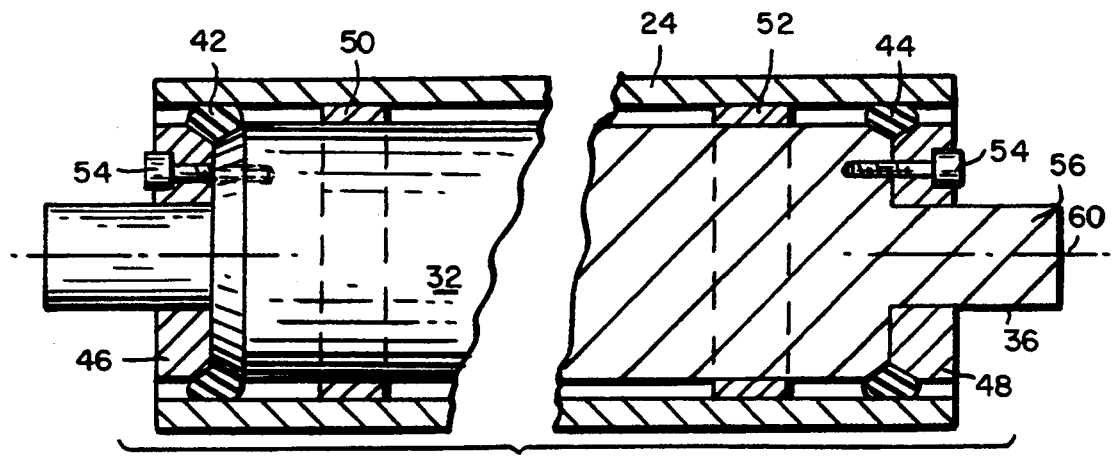
FIG. 4 is a longitudinal sectional view of the shell of FIG. 2 mounted to the tool of FIG. 3 for processing into a finished drum.

In accordance with the present invention, we process the shell 22 in such a manner as to establish an effective rotational axis for the resultant drum that is coincident with the center of the inner surface of the shell, and that provides an outer surface concentric with the inner surface. Referring now to FIG. 3, tooling to accomplish the purposes of the invention is shown. A cylindrical mandrel 32 having extending end supports 34, 36 and beveled end faces 38, 40 cooperates with gaskets 40, 42 and end plates 46, 48 which are likewise beveled on their inner faces (i.e., facing the mandrel 32). To begin the processing of the blank 24, the mandrel 32 is inserted into the shell as shown in FIG. 4. In order to prevent scratching the interior of the shell, bands 50, 52 of a soft, non-scratching, compliant material such as straps faced with soft cotton are placed around the mandrel and secured to it (e.g., with adhesive) before the mandrel is inserted into the shell. Gaskets 42, 44 (e.g., O-rings) are then placed into the inside of the shell, butted against the beveled edges 36, 38 of the mandrel 32. Next, the end plates 46, 48 are slipped onto the mandrel, and secured to it by screws 54, 56. For purposes of illustration, only a single pair of screws are shown, but it will be understood that a number of screws or other fasteners distributed about the periphery may be used. As the screws are tightened, the gaskets 42, 44 are increasingly distorted, and press tightly against the shell, thereby effectively securing and positioning the mandrel within the shell for subsequent processing operations and also centering the mandrel within the shell to ensure that the longitudinal axis 60 of the shell is essentially coincident with the longitudinal axis or centerline 60 of the inner surface of the shell 24.

The assembled unit is now placed in a lathe, secured by the supports 34, 36, and the shell is "turned", that is, a cutting tool (not shown) bears against the surface of the shell and removes material from it as the mandrel 32 is rotated in the lathe. The axis 60 of the mandrel serves as the axis of rotation of the shell, and thus defines the effective longitudinal axis for the formed outer surface of the shell. This process thus forms a shell whose outer surface is coincident within a desired tolerance with that of the inner surface.

After the shell is formed to the desired radius, and while it is still engaged on the mandrel 32, the end faces of the shell are bored to provide an inset or step (FIG. 5) for receipt of the end caps. This step provides a portion of the inner surface of the shell with surfaces 64, 64' concentric with the outer surface and thus referenced to precisely the same longitudinal axis as that of the mandrel 32 (within the limits of accuracy of the milling machine). This axis is effectively transferred to the scanner by means of end caps 66, 66' which are fitted to the opposite ends of the finished shell 24' to form the completed scanning drum and to preserve the rotational axis about which the outer surface of the drum was formed.

Figure 5:
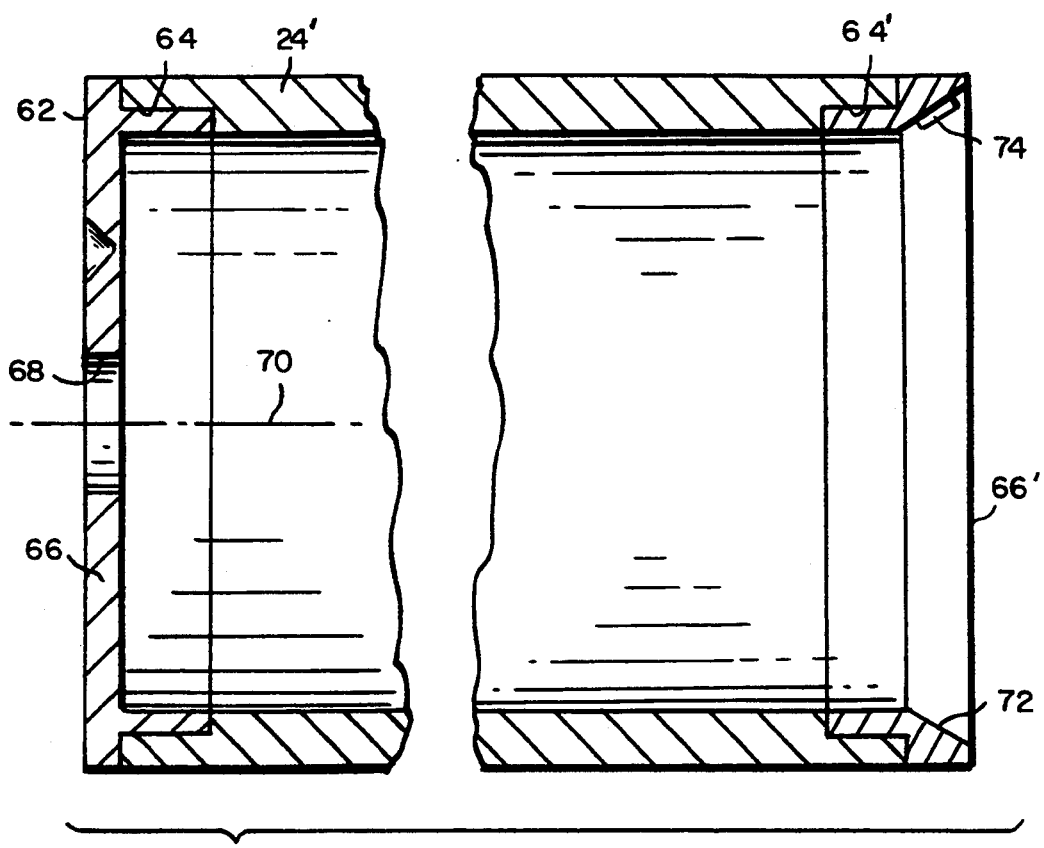
FIG. 5 is a longitudinal sectional view of the finished drum with end caps fitted to the drum to enable mounting on a scanner.

As shown in FIG. 5, at least one of the end caps, e.g., end cap 66, preferably has a centrally located hole 68 extending therethrough and providing a rotational axis 70 that is concentric with that of the mandrel 32 and thus concentric with the rotational axis of the outer surface of the finished shell. This ensures that a document mounted on the outer drum surface for scanning remains at a constant distance from the rotational axis of the scanner system and thus also a constant distance from the imaging lens. The result is a low cost scanner drum with a precision heretofore obtainable only in systems of considerably greater cost.

The other end cap, 66', is adapted to mate with a frusto-conical spindle as described in the Lehman et al application noted earlier. To this end, the cap has a tapered face 72 on the end thereof. A plurality of resilient pads 74 of rubber or the like are distributed about the periphery of the drum in order to provide a degree of vibration isolation. Preferably, at least three such pads distributed equally about the periphery are used.

The yield of usable drums is further increased by use of the calibration strip 21 shown in FIG. 1. This strip extends from side to side on the drum, and extends along the circumference of the drum by a limited amount, e.g., ¾ inch. As described more fully in the copending application of Lehman et al referred to above, it provides a calibration reference for both reflective and transmissive scanning. It is opaque, and thus blocks light from passage through it. This strip is applied as part of the final manufacturing of the drum. Since the outer surface of the drum is concentric with respect to the longitudinal drum axis and thus symmetric with respect to this axis, all positions along the circumference are equivalent and the strip may thus be located at an arbitrary position. However, if an objectionable inclusion is found in the drum, the strip is located in a position such as to cover this and any other occlusions that may lie within its limits. This will occasionally save a drum that otherwise would be objectionable.

CONCLUSION

From the foregoing it will be seen that we have provided a drum for a rotary scanner having a highly concentric imaging surface characteristic of drums of considerably greater cost. Further, we have provided a process for manufacturing such a drum that is readily implemented with simple tooling described herein. Means are provided to accommodate certain undesired inclusions in the drum material, as well as to minimize vibration coupling between the drum and the scanner in which it is mounted.

It will be understood that the foregoing has described an illustrative embodiment only, and that various changes may be made therein without departing from either the spirit or the scope of the invention.

We claim:

1. A method of manufacturing a drum for a rotary scanner comprising the steps of:
    mounting a cylindrical shell on a fixture establishing a defined longitudinal axis concentric with an inside surface of said shell,
    providing relative rotation between said shell and a cutting tool about said defined axis to thereby remove material from an outside surface of said shell in an arc about said axis, and
    fitting end caps to said shell to thereby establish a longitudinal axis of said drum coincident with the defined longitudinal axis of said fixture, said end caps providing an interface between said drum and said scanner.

2. A method of manufacturing a scanner drum in accordance with claim 1 which includes the step of mounting said fixture on a lathe for rotation about said defined axis and in which said cutting tool is mounted adjacent said shell for removing material therefrom as said shell is rotated.

3. A method of manufacturing a scanner drum in accordance with claim 1 in which said step of mounting a cylindrical shell on a fixture includes the steps of:
    inserting a mandrel within said shell, and
    applying a force between said mandrel and said shell to secure said shell to said mandrel for working by said tool.

4. A method of manufacturing a scanner drum in accordance with claim 3 in which said step of mounting a cylindrical shell on a fixture comprises the steps of:
    providing first and second end plates for attachment to opposite ends of said mandrel,
    interposing first and second gaskets between the corresponding end plates and opposite ends of said mandrel, and
    fastening said end plates to said mandrel thereby distorting said gaskets against said shell to thereby secure said shell to said mandrel.

5. A method of manufacturing a scanner drum in accordance with claim 4 in which said mandrel and said end plates include beveled edges on mating faces thereof, and said step of interposing comprises the step of:
    positioning said gaskets in respective grooves formed where said mandrel and end plates meet.

6. A method for manufacturing a rotary scanner drum for use in both transmissive and reflective scanners, wherein an inner wall surface and the outer wall surface of the drum are concentric, comprising the steps of:
    mounting transparent shell stock in a cylindrical fixture such as a mandrel, the cylindrical shell formed thereby initially having an internal and external radius of curvature which varies both azimuthally and longitudinally by an amount that would normally preclude its use as a scanner drum, the mandrel being of a length comparable to that of the shell to be formed into the scanner drum, and the mandrel being of a diameter slightly less than the smallest inside diameter of the shell,
    fixing the mandrel to the shell by attaching a pair of end plates to the mandrel after the latter is inserted into the shell, together with a corresponding pair of gaskets which are positioned intermediate the respective end plates and mandrel, the ends of the mandrel and the inner ends of the end plates being beveled in order to cradle the gaskets between the end plates and the mandrel;
    securing the end plates to the mandrel with fasteners in a manner such that as the fasteners are tightened, the gaskets are increasingly forced against the shell, thereby locking it against the mandrel,
    mounting the mandrel in a machining tool such as a lathe, and turning the outer surface of the shell against a tool to progressively remove outer material from the shell to bring it to a desired outer diameter, so that the outer surface of the shell is thus formed concentric with the longitudinal axis of the mandrel, to effectively define the rotational axis of the shell, and
    fitting a pair of end caps to the shell to form the drum, the end caps formed to have an accurately defined axis of rotation so that, together, they define the axis of rotation of the resultant drum, and so that the rotational axis effectively defined by the mandrel during processing of the shell is preserved by means of the end caps.

* * * * *